US012608623B2

(12) United States Patent　　　(10) Patent No.:　US 12,608,623 B2

Bnaya et al.　　　(45) Date of Patent:　Apr. 21, 2026

(54) OPTIMIZATION FOR FINITE STATE MACHINE MODELED SYSTEMS

(71) Applicant: GM GLOBAL TECHNOLOGY OPERATIONS LLC, Detroit, MI (US)

(72) Inventors: Zahy Bnaya, Petach Tikva (IL); Daniel Rubin, Holon (IL); Asaf Degani, Tel Aviv (IL); Yael Shmueli Friedland, Tel Aviv (IL); Shani Avnet, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 528 days.

(21) Appl. No.: 18/347,841

(22) Filed: Jul. 6, 2023

(65) Prior Publication Data

US 2025/0013878 A1　　　Jan. 9, 2025

(51) Int. Cl.
*G06N 3/12*　　　(2023.01)
(52) U.S. Cl.
CPC ...................................... *G06N 3/12* (2013.01)
(58) Field of Classification Search
CPC ...................................................... G06N 3/12
See application file for complete search history.

(56) References Cited

U.S. PATENT DOCUMENTS

| | | | | |
|---|---|---|---|---|
| 5,517,432 A * | 5/1996 | Chandra | ................. | G06F 30/33 716/136 |
| 5,539,680 A * | 7/1996 | Palnitkar | ........ | G01R 31/318364 703/13 |
| 6,035,109 A * | 3/2000 | Ashar | ................. | G06F 30/3323 716/107 |
| 6,446,243 B1 * | 9/2002 | Huang | .................... | G06F 30/33 716/136 |
| 6,487,704 B1 * | 11/2002 | McNamara | ........... | G06F 11/261 714/E11.167 |
| 6,691,078 B1 * | 2/2004 | Beer | ................... | G06F 30/3323 703/15 |
| 6,853,963 B1 | 2/2005 | Apfelbaum et al. | | |
| 7,539,604 B1 * | 5/2009 | Stothert | ................. | G06F 30/20 700/182 |

(Continued)

OTHER PUBLICATIONS

David Harel; Statecharts: A Visual Formalism for Complex Systems; Science of Computer Programming 8 (1987) ; Department of Applied Mathematics, The Weizmann Institute of Science, Rehovot, Israel; pp. 231-274.

(Continued)

*Primary Examiner* — David E Choi

(74) *Attorney, Agent, or Firm* — Quinn IP Law

(57)　　　ABSTRACT

A supportive software-based "toolbox" for optimizing finite state machine (FSM)-modeled systems. The optimization may include defining a plurality of alternative models for the FSM-modeled system and iterating one or more of the domain alternative into iterated alternatives. The optimization may include generating a plurality of stateflow representations for the FSM-modeled system according to the iterated alternatives, and based thereon, generating a model score for each of the stateflow representations predictively ranking the stateflow representations based at least in part on one or more of user experience, usability, correctness, transformability, effectiveness, and readiness.

20 Claims, 3 Drawing Sheets

(56) References Cited

U.S. PATENT DOCUMENTS

| | | | | |
|---|---|---|---|---|
| 8,046,207 | B2 * | 10/2011 | Glass | G06F 11/3447 |
| | | | | 716/136 |
| 8,417,689 | B1 * | 4/2013 | Waas | G06F 9/54 |
| | | | | 707/718 |
| 8,849,626 | B1 * | 9/2014 | Kumar | G06F 8/34 |
| | | | | 703/2 |
| 8,903,699 | B2 * | 12/2014 | Vanspauwen | G06F 30/20 |
| | | | | 703/15 |
| 10,007,746 | B1 * | 6/2018 | Wolfovitz | G06F 30/3323 |
| 2002/0023256 | A1 * | 2/2002 | Seawright | G06F 30/30 |
| | | | | 716/105 |
| 2006/0221658 | A1 * | 10/2006 | Gould | G06F 21/567 |
| | | | | 365/49.1 |
| 2007/0179917 | A1 * | 8/2007 | Patel | G06N 3/126 |
| | | | | 706/13 |
| 2007/0222793 | A1 * | 9/2007 | Olhofer | G06T 17/30 |
| | | | | 345/619 |
| 2007/0244678 | A1 * | 10/2007 | Averill | G06Q 10/04 |
| | | | | 703/22 |
| 2012/0278059 | A1 * | 11/2012 | Benjamin | G06F 8/314 |
| | | | | 703/22 |
| 2015/0169303 | A1 * | 6/2015 | Zhao | G06F 8/443 |
| | | | | 717/160 |
| 2018/0336294 | A1 | 11/2018 | El-Maleh | |
| 2021/0173971 | A1 * | 6/2021 | Choi | G06F 30/20 |
| 2022/0398367 | A1 * | 12/2022 | Liszewski | G06F 30/33 |
| 2022/0405442 | A1 * | 12/2022 | Schmidt | G06F 30/10 |
| 2024/0427689 | A1 * | 12/2024 | Degani | G06F 30/15 |
| 2025/0013878 | A1 * | 1/2025 | Bnaya | G06N 3/12 |
| 2025/0094670 | A1 * | 3/2025 | Rubin | G06F 30/23 |

OTHER PUBLICATIONS

Finite-state machine, Jochen Burghardt, Wikipedia, https://en.wikipedia.org/w/index.php?title=Finite-state_machine&old, Jun. 15, 2023, 9 pages.

Layoutsynthese Elektronischer Schaltungen; Lienig, Jens, Grundlegende Algorithmen für die Entwurfsautomatisierung. 2. Auflage, Springer Vieweg, Berlin, 2016, ISBN: 978-3-662-49815-6, DOI: 10.1007/978-3-662-49815-6, 2 pages.

State Diagram, Lotus Research Labs, Wikipedia "https://en.wikipedia.org/w/index.php?title=State_diagram&oldid=1125724229", 5 pages.

* cited by examiner

10

12

13

14

15  System Traits

21  $T_F$

110

16  User Inputs

18  Existing Designs

MP  54  56

11

110  $T_F$

17

18

19S

25  Design Optimization Platform

22  Ext Device $T_i$  19

$T_P$  20

160

120

12A  12B  12N

OPTIMIZATION FOR FINITE STATE MACHINE MODELED SYSTEMS

INTRODUCTION

The present disclosure relates to a supportive software-based "toolbox" for aiding in the design and implementation of a finite state machine (FSM)-modeled systems having multiple states, state transitions/mode changes, and other potentially complex behavior. The present approach is intended to aid system designers, programmers, and other users in optimizing the system design.

Finite state machines are mathematical abstractions frequently used to design and validate the behavior of a myriad of different software programs and physical systems. A finite state machine may be graphically represented as a stateflow diagram, state transition table, or hierarchical state machine/diagram, e.g., a statechart. FSM-modeled systems begin from an initial state. Based on the present state of the designed system and a given single event or combination of events ("super events"), a finite state machine is able to transition between various additional states in response to system inputs or triggering events. Although the state transition table or stateflow diagram is instrumental to the overall system design process, the design of the FSM-modeled system may benefit from optimization.

SUMMARY

Disclosed herein are systems and associated methods for aiding a user, a software programmer, a designer, a system developer, etc. in optimizing system designs, such as but not necessarily limited to optimizing a finite state machine (FSM)-modeled system using iterative modeling of domain knowledge rules to predictably rank state flow representations of the FSM-modeled system according to one or more of user experience, usability, correctness, transformability, effectiveness, and readiness. The automated methodology contemplated herein is particularly well suited for designing systems having relative complex and/or highly interactive behavioral traits, e.g., across a wide range of possible states, state transitions, state or mode-triggering events, and outputs. For instance, motor vehicles having automation control capabilities have relatively complex operating modes and state transition rules. Some of these modes are executed automatically/autonomously or in response to driver inputs, while other modes may be based on timers, hidden logic, or other automatically occurring activation criteria. Other complex systems such as avionics, medical devices, and associated control logic for a wide range of mobile or stationary systems are designed using finite state machine techniques, and would likewise benefit from the automated verification method as described in detail below.

One non-limiting aspect of the present disclosure relates to a design optimization platform. The design optimization platform may include a system design module configured for receiving data associated with a design of a finite state machine (FSM)-modeled system from a user device. The data may describe states, state transitions, events, and outputs of the FSM-modeled system. The design optimization platform may further include a combination generator module configured for generating a plurality of stateflow representations for the FSM-modeled system, optionally with each of the stateflow representations reflecting behavior of the FSM-modeled system when operating according to one or more alternatives for one or more of the states and state transitions, events, and outputs of the FSM-modeled system.

The design optimization platform may still further include a scoring mechanism module configured for generating a score for each of the stateflow representations.

The design optimization platform may include a domain knowledge rules module configured for containing a plurality of domain knowledge rules used to define the alternatives.

The combination generator module may be configured for generating a plurality of iterated stateflow representations for the FSM-modeled system according to iterated alternatives, optionally with each of the iterated stateflow representations representing behavior of the FSM-modeled system when operating according to one or more of the iterated alternatives.

The scoring mechanism module may be configured for generating an iterated score for each of the iterated stateflow representations.

The design optimization platform may include an optimized design module configured for determining an optimized stateflow representation for the FSM-modeled system based at least in part on the scores and the iterated scores.

The scoring mechanism module may be configured for calculating the scores and the iterated scores according to an optimization algorithm.

The design optimization platform may include a weightings module configured for assigning weight values to be used by the scoring mechanism module in calculating the scores and the iterated scores.

The values may be assigned for one or more of level hierarchy, nested structures, quantity of connections between states, radius of state diagram, space between states, and predefined structures.

The scoring mechanism module may include an optimization algorithm configured to operate as a genetic algorithm.

The scoring mechanism module may include an optimization algorithm configured to operate as a local search algorithm.

One non-limiting aspect of the present disclosure relates to design optimization platform. The design optimization platform may include a system design module configured for receiving data associated with a design of a finite state machine (FSM)-modeled system from a user device. The data may describe states, state transitions, events, and outputs of the FSM-modeled system. The design optimization platform may further include a combination generator module configured for generating a plurality of stateflow representations for the FSM-modeled system according to domain and iterated alternatives, optionally with each of the stateflow representations reflecting behavior of the FSM-modeled system when operating according to one or more of the domain and iterated alternatives. The design optimization platform may still further include a scoring mechanism module configured for generating a score for each of the stateflow representations.

The design optimization platform further comprising an optimized design module configured for determining an optimized stateflow representation for the FSM-modeled system based at least in part on the scores determined for the stateflow representations.

The optimized design module may be configured for directing the iteration module to iterate the domain alternatives into the iterated alternatives based at least in part on analyzing one or more of the scores according to an optimization algorithm.

The scoring mechanism module may be configured for calculating the scores according to an optimization algorithm.

One non-limiting aspect of the present disclosure relates to method for design optimization. The method may include receiving data associated with a design of a finite state machine (FSM)-modeled system from a user device. The data may describe states, state transitions, events, and outputs of the FSM-modeled system. The method may further include receiving a plurality of domain knowledge rules to define domain alternatives for one or more of the states and state transitions of the FSM-modeled system and generating a plurality of stateflow representations for the FSM-modeled system, optionally with each of the stateflow representations reflecting behavior of the FSM-modeled system when operating according to one or more of the domain alternatives. The method may still further include generating a score for each of the stateflow representations.

The method may include generating the domain alternatives based at least in part on randomizing one or more characteristics for the domain knowledge rules.

The method may include automatically iterating one or more of the domain alternatives into iterated alternatives and generating a plurality of iterated stateflow representations for the FSM-modeled system, optionally with each of the iterated stateflow representations expressing original behavior of the FSM-modeled system when operating according to one or more of the iterated alternatives.

The method may include generating an iterated score for each of the iterated stateflow representations.

The method may include determining an optimized stateflow representation for the FSM-modeled system based at least in part on the scores and the iterated scores.

The method may include calculating the scores and the iterated scores using an optimization algorithm.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure. The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Figures 1, 1A:
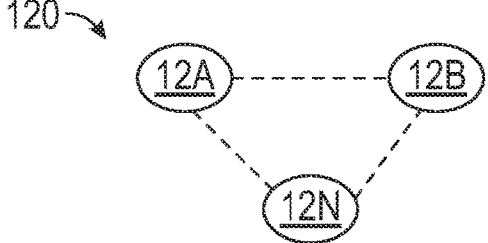
FIG. 1 illustrates a system for use in designing and implementing a system using finite state machine (FSM)-based design techniques, with the system being configured to optimize the designed system in accordance with the disclosure.
FIG. 1A illustrates an exemplary embodiment of distributed processing nodes for use in implementing portions of the system shown in FIG. 1.

The present disclosure may be embodied in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

Referring to the drawings, wherein like reference numbers refer to like features throughout the several views, FIG. 1 depicts a system 10 configured to facilitate design of a finite state machine (FSM)-modeled system. Due to the criticality of achieving a sound design, especially as close to a perfect understanding and implementation of a designed system as is possible in the context of high risk design process, and to develop systems that are free of incorrect structures that can lead to design errors and incorrect user interaction, it is useful to verify that the designed system and associated human-machine interfaces will behave in a logical manner and in a way that their behavior is expected by end-users (a user 11, e.g., a designer or programmer, as opposed to a driver, pilot), or other end user of a physical embodiment of the modeled system. An ability to recognize patterns in the FSM-modeled system, or what may be generically referred to herein as system patterns, may be supportive in providing a software-based "toolbox" for aiding a design team.

To that end, the present solutions make it possible for the user 11 to optimize design of the FSM-modeled system. Additionally, the presented approach supports a structured hierarchical design of the modeled system as set forth herein. As described in detail below with reference to FIGS. 2 and 3, the system 10 as contemplated herein has a goal of automatic design of efficient/usable systems based on preferences indicated by users over several configurations, optionally leveraging structural properties that exist in models for predicting effectiveness. The contemplated optimization may include generating large numbers of combinations and searching through the combination space using local search, genetic algorithms, and the like for advancing and converging the design to an optimized design for the FSM-modeled system.

The system 10 illustrated in FIG. 1 may include a user device 12, e.g., a laptop computer, tablet computer, desktop computer, mobile application ("app"), or another application-suitable host machine configured for assisting the user 11 in the design of potentially complex hardware and/or software-based system. Although the user device 12 is depicted in FIG. 1 as a single computer device for illustrative simplicity, those skilled in the art will appreciate that the user device 12 could be implemented as a distributed user device 120 having multiple processing nodes, e.g., 12A, 12B, . . . , 12N, as depicted schematically in FIG. 1A. Such processing nodes may be in communication with one another over suitable wired, wireless, and/or cloud-based networked connections. The system 10, and underlying systems, may be used for benefitting the design of human-machine interfaces ("HMIs") or other devices aboard a motor vehicle or an aircraft, watercraft, rail vehicle, or another dynamic system, or to model performance of a medical device, powerplant, or another static system.

The system 10 illustrated in FIG. 1 may also include one or more peripheral devices 13, including a display screen 14 operable as an output device for the user device 12. The user 11 may interact with the user device 12 via one or more additional peripheral devices 13 (not shown), e.g., a mouse, keyboard, touch inputs to the display screen 14, etc., when developing or designing state transition tables for the FSM-modeled system, including functions of resident software and/or hardware thereof. The present solutions are intended to facilitate the downstream verification of system behavior subsequent to the proper and thorough design of an FSM and corresponding state transition table(s). Among the many possible attendant benefits of the present solutions, the user 11 is better able to identify, within the larger design, precisely where the design is not well structured and lacks adequate hierarchy.

As part of the present strategy, the host computer 12 of FIG. 1 or its constituent processing nodes 12A, 12B, . . . , 12N of FIG. 1A may be equipped with non-transitory, tangible computer-readable storage medium or memory (M) 54 having non-transitory instructions stored thereon, and one or more processors (P) 56, e.g., logic circuits, combinational logic circuit(s), Application Specific Integrated Circuit(s) (ASIC), electronic circuit(s), central processing unit(s), semiconductor IC devices, etc., as well as input/ output (I/O) circuit(s), appropriate signal conditioning and buffer circuitry, and other components such as a high-speed clock to provide the described functionality. The associated memory 54 may include application-suitable amounts and types of non-transitory memory inclusive of read only, programmable read only, random access, a hard drive, etc., whether resident, remote or a combination of both.

Figure 3:
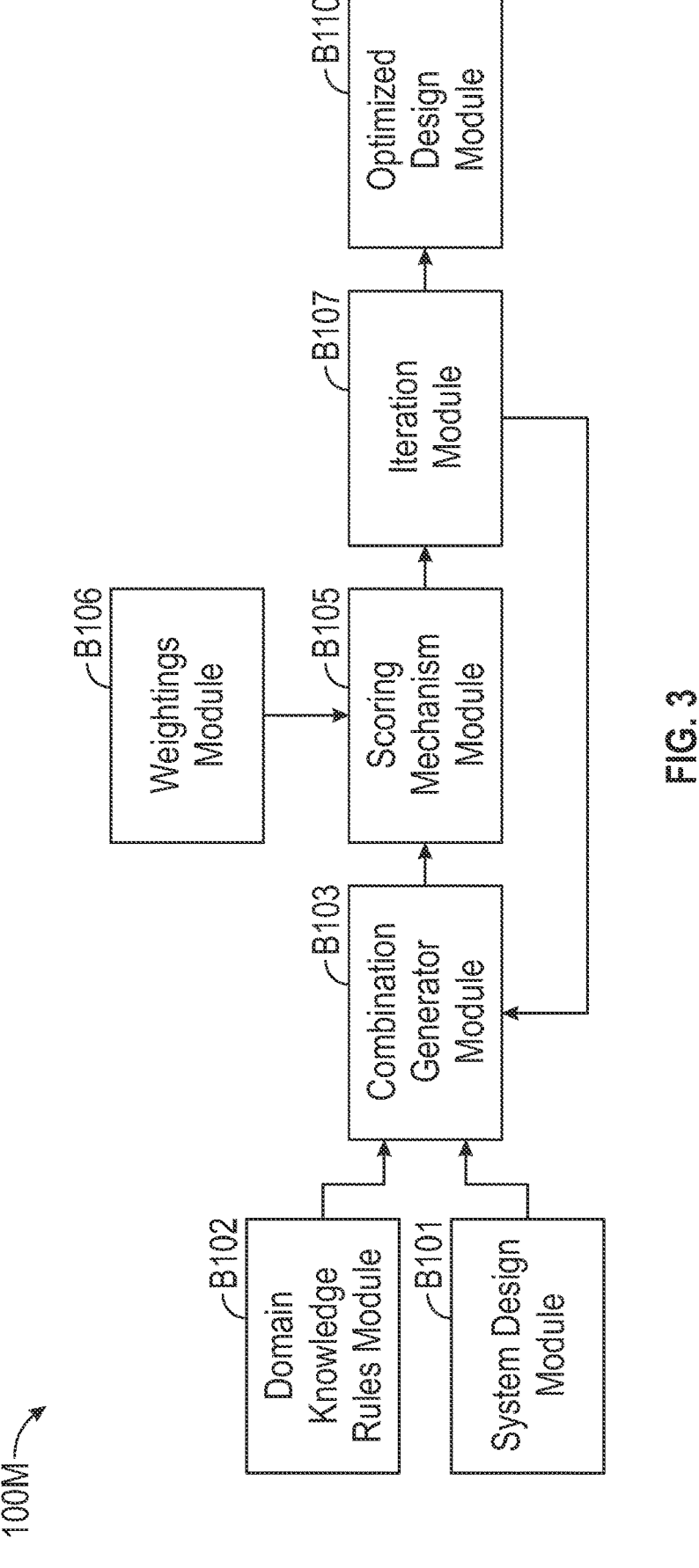
FIG. 3 is a flow diagram of a method for optimizing designs in accordance with an embodiment of the disclosure.

As a precursor to performing the method 100M of FIG. 3, the user device 12 illustrated in FIG. 1 receives system traits 15 and user inputs 16 from the user 11. This action could entail receiving various states, state transitions, and events of the modeled system, along with a possible "super-events" (event combinations), hierarchy definitions, and other system traits 15 for the FSM-modeled system. In response to the received system traits 15, the user device 12 automatically generates and outputs a first data set 17 embodying a blank/unpopulated initial state transition table (Ti) 19. This initial state transition table 19 may be generated or received, for example, as complete of a population of possible states and events of the modeled system as possible, and with the system traits 15 entered by the user 11. Additionally, the user device 12 in some embodiments automatically populates the initial state transition table 19 with a second data set 18 to generate a third data set 19S, with the third data set 19S including a populated state transition table ("$T_P$") 20.

After performing one or more iterations, the user device 12 ultimately outputs a final state transition table ($T_F$) 21. The final state transition table 21 may serve as data 110 associated with the design of the FSM-modeled system, with the data 110 used by a design optimization platform 25 in accordance with the disclosure. The user inputs 16, a hard coding, or other mechanism or entity may be used to identify a plurality of domain knowledge rules to at least partially define domain alternatives for one or more of the states, state transitions, events, and outputs of the FSM-modeled system, which may additionally include generating the domain alternatives based at least in part on randomizing one or more characteristics according to the domain knowledge rules. The data 110 thus is a starting point for further investigation by the user 11 when performing the method 100M of FIG. 3, i.e., when optimizing the design of the FSM-modeled system exhibits.

Figure 2:
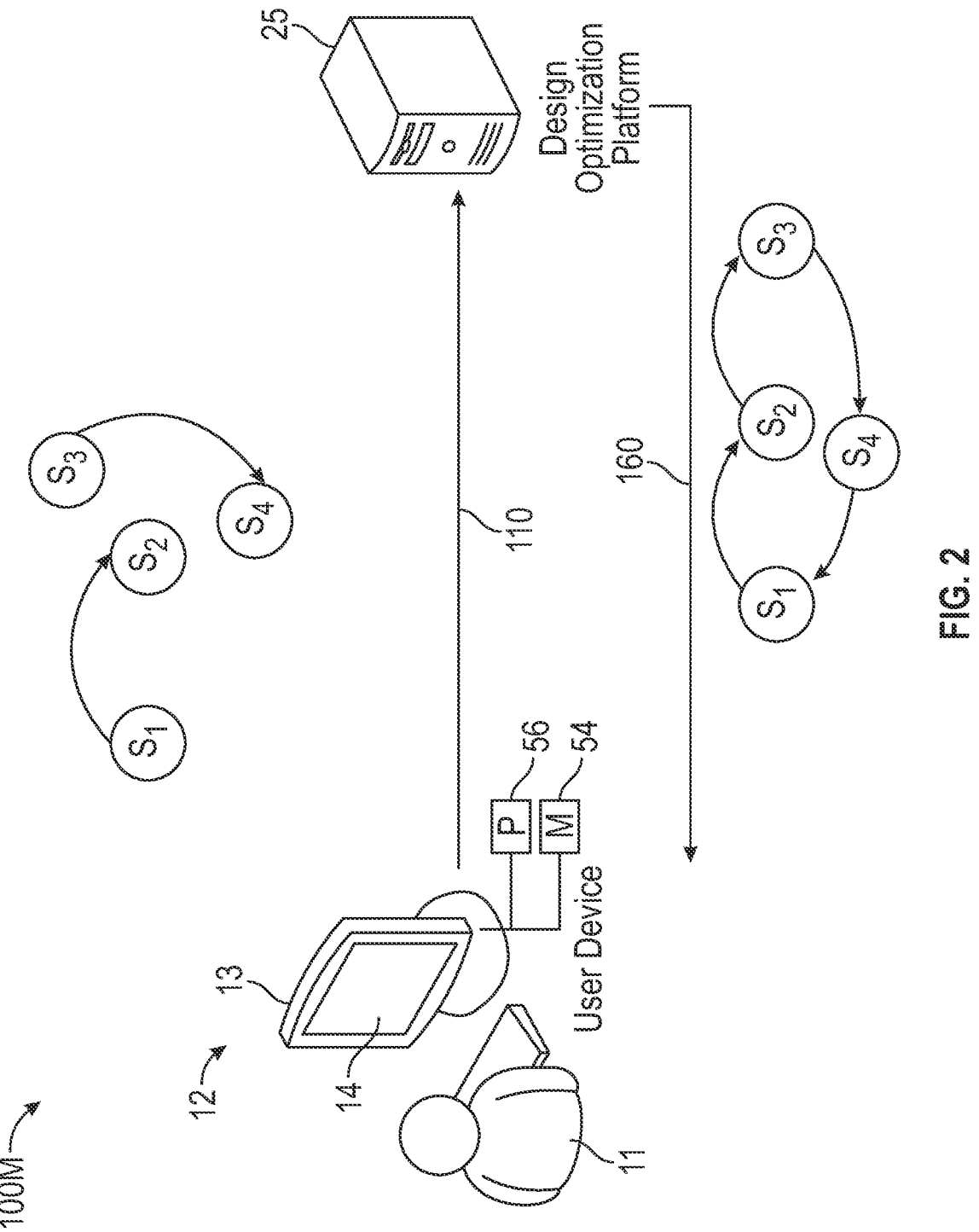
FIG. 2 illustrates an optimization method in accordance with the disclosure.

Referring briefly to FIG. 2, the system 10 of FIG. 1 may involve interaction of the user device 12 and the design optimization platform 25. In general, the present approach involves receiving the data 110 associated with a set of domain knowledge rules, with optional randomization of the characteristics associated therewith, and a system design, including the various states, state transitions, events, and outputs, which as noted above may include details for existing designs 18. The existing designs 18, the final state table 21 and/or other information described in FIG. 1 may be included with or fully embody the data 110. As contemplated herein, the design optimization platform 25 may utilize iterative modeling of domain knowledge rules for predictably ranking state flow representations of the FSM-modeled system according to one or more of user experience, usability, correctness, transformability, effectiveness, and readiness.

A control action may then be performed in response to identifying an optimized design as set forth below. For instance, nominal states $S_1$, $S_2$, $S_3$, and $S_4$ may be specified in the data 110, potentially with data that describes static properties, dynamic properties, structural properties, states, state transitions, events, and outputs of the FSM-modeled system. As part of the present method 100M of FIG. 3, the design optimization platform 25 could thereafter perform one or more control actions associated with optimizing the behavior, for instance by indicating the optimized design, i.e., a one or more state flow representations for the FSM-modeled system having a highest ranking.

Referring now to FIG. 3, a logic flow diagram is shown that illustrates an embodiment of the present method 100M. The logic flow diagram is constructed from constituent logic segments or blocks, with each block implemented manually and/or automatically as needed, e.g., as one or more algorithms or code segments. Those skilled in the art will appreciate that the flow diagram of FIG. 3 also lends itself to the implementation of constituent hardware/software modules each configured to perform the associated tasks. Thus, the terms "block" and "module" are used hereinbelow synonymously.

Block B101 (System Design Module) feeds into method 100M to enable the user device 12 of FIG. 1 to receive data associated with the design of the FSM-modeled system ("system design"). The system design module/Block B101 provides as complete a record as possible of the states, state transitions, events, and user-facing indications ("outputs") of the FSM-modeled system. The system design may include data describing static properties, dynamic properties, structural properties, states, state transitions, events, and outputs of the FSM-modeled system. Block B101 is configured for constructing a viable system design for the FSM-modeled system. As appreciated in the art, this effort in turn involves the generation and error-checking of one or more state transition tables and/or transition diagrams, e.g., using the automated approach described in U.S. patent application Ser. No. 18/318,006, filed on May 16, 2023, which is hereby incorporated by reference in its entirety, or using another sufficiently developed state transition table, e.g., the final state transition table 21 of FIG. 1. Such data is received at block B102 as inputs to the method 100M.

Block B102 (Domain Knowledge Rules Module) feeds into method 100M to enable the user device 12 of FIG. 1 to receive data associated with a plurality of domain knowledge rules. The domain knowledge rules, for example, may be used to at least partially define domain alternatives for one or more of the states, state transitions, events, and outputs of the FSM-modeled system. Block B102 may be configured for optionally utilizing a randomization process for randomizing or otherwise expanding upon the domain knowledge rules. Block B102 may be configured to generate a plurality of domain alternatives in this manner. The domain alternatives may be used with Block B103 (Combination Generator Module) as a mechanism for subjecting the system design to various simulations, test, sequences, etc. for purposes iteratively optimizing the system design through convergence to the optimized design.

Block B103 relates to generating a plurality of stateflow representations for the FSM-modeled system according to the domain alternatives. The stateflow representations may be used for reflecting behavior of the FSM-modeled system when operating according to one or more of the domain alternatives. The stateflow representations may correspond with datasets, tables, diagrams, etc., which may be prepared to include metrics, values, statistics, and other suitable information for modeling the system design according to the domain alternatives without having to visually or physically produce actual stateflow diagrams. The stateflow representations may be beneficial in this manner for improving recognition of the FSM-modeled system when behaving according to the domain alternatives, which may be beneficially done without requiring a design team to physically depict the states, state transitions, interactions, outputs, etc.

The stateflow representations modeled according to the domain alternatives, i.e., various characteristics, randomization, options, etc., may be fed to Block B105 (Scoring Mechanism Module). Block B105 may be configured for generating a score for each of the stateflow representations. Each score may be used for ranking a corresponding one of the stateflow representations based at least in part on one or more of user experience, usability, correctness, transformability, effectiveness, and readiness. Block B106 (Weightings Module) may be configured for assigning weight values to be used by Block B105 in calculating the model scores. The weighted values may be variable to account for different contingencies, measure the influence of different alternatives on system performance, etc.

To further enhance the analysis performed based on the domain knowledge rules and/or the randomization thereof, Block B107 (Iteration Module) may be employed to iterate or otherwise adjust the domain alternatives used when calculating the scores. Block B107 may be used in this manner to automatically vary the domain alternatives, i.e., the domain rules, and/or the randomization thereof, to provide additional characteristics, scenarios, etc. for use in additionally iterating operation of the FSM-modeled system. The iteration of the domain alternatives, i.e., the generation of iterated alternatives, may be performed based on the scores. This may be useful in automatically generating the iterated alternatives based on prior scoring analysis performed for the FSM modeled system, such as to further test and simulate for specific scenarios. Block B107 may be configured for iterating the domain knowledge rules, such as one configured to operate as a genetic algorithm and/or a local search algorithm.

The iterated alternatives may be fed to Block B103 for use in generating a plurality of iterated stateflow representations for the FSM-modeled system. The iterated stateflow representations may be used for reflecting behavior of the FSM-modeled system when operating according to one or more of the iterated alternatives. The iterated stateflow representations may be similar to the above-described stateflow representations, with a further benefit of varying the analysis of the FSM-modeled system to automatically account for potentialities that may have not been addressed with the user input of the domain knowledge rules. Block B105 may be configured for generating iterated scores for each of the iterated stateflow representations. The iterated scores may be generated, weighted, or otherwise calculated in a manner identical to the stateflow representations so as to provide normalization between the scores and the iterated scores. The capability to generate iterated scores based on user inputs (scores) as well as based on computer-generated inputs (iterated scores) may be beneficial in improving behavior of the FSM-modeled system beyond the limitations of human inputs.

Block B110 (Optimization Design Module) may be configured for determining an optimized stateflow representation for the FSM-modeled system based at least in part on the scores. The optimized stateflow representation may correspond with a selected one or more of the domain and iterated stateflow representations having the highest ranking based on the corresponding iterated scores. The optimized stateflow representations may be generated in this manner by iteratively creating new models, e.g., domain and iterated stateflow representations, and scoring them until convergence to the optimized stateflow representation is determined. This procedure may be performed multiple times, optionally using different weightings of the scoring mechanism. The scoring or determination of the optimized design may be based on, for example, level of hierarchical (nested) structures (e.g., higher may be better), number of connections between states (e.g., fewer may be better), radius of the diagram (e.g., smaller may be better), space between states (e.g., larger may be better), predefined structures that are known to be good (e.g., more may be better).

As supported above, the design optimization platform 25 may be configured to utilize stateflow representations that are normally used to represent finite state machines. The design optimization platform 25 may be intended to support designers in improving the quality of their designs, while minimizing design cycle iterations, by using a model optimization platform 25 to automatically generate optimized stateflow representations based on a user's design preferences and computer-iterated alternatives thereto. The design optimization platform 25 may process model data and domain-knowledge data, which may include information or domain rules on generating stateflow representations. The domain rules may include definitions for a correct stateflow representations and rules for transformations on a representation. Examples of definition for a correct stateflow representation may include: each vertex is represented by a closed shape (usually square or circle); each vertex is labeled with unique designator symbols or words written inside them; transitions from one state to another; an edge is usually drawn as an arrow directed from the present state to the next state; the label of a transition rule is written next to the corresponding edge; the initial state is indicated with an arrow with no origin pointing to it; output of each state can be written inside it or in a separate table; and/or a given state can be contained inside a single "parent" state (not more than 1 parent at same hierarchy).

Examples of rules for transformations on a representation may include: adding an edge between two unconnected vertices; removing an edge between two connected vertices; splitting a single state into two separate states; merging two states into a single state; adding edges from each state into the initial state; and/or assigning a direction to an edge (adding "previous/next" relationship). The domain-knowledge data may include predefined rules and may be updated by the user. For example, a user may update the rules regarding the spacing between states for stateflow representations. The model characteristics are properties associated with graph theory. The model characteristics may include, but are not limited to, level hierarchical (nested) structures, a number of connections between states, a radius of the representation, a space between states, and predefined structures. In some implementations, the scoring mechanism, for example, may use a weighted sum of squares of the model characteristics of stateflow representations to assign a score to each stateflow representation, however a wide range of other calculations may also be employed. The optimization algorithm may use a heuristic method for determining an optimized stateflow representation. For example, the optimization algorithm may use a genetic algorithm or a local search algorithm.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A design optimization platform, comprising:
a system design module configured for receiving data associated with a design of a finite state machine (FSM)-modeled system from a user device, wherein the data describes states, state transitions, events, and outputs of the FSM-modeled system;
a combination generator module configured for generating a plurality of stateflow representations for the FSM-modeled system, each of the stateflow representations reflecting behavior of the FSM-modeled system when operating according to one or more alternatives for one or more of the states and state transitions, events, and outputs of the FSM-modeled system; and
a scoring mechanism module configured for generating a score for each of the stateflow representations.

2. The design optimization platform according to claim 1, further comprising:
a domain knowledge rules module configured for containing a plurality of domain knowledge rules used to define the alternatives.

3. The design optimization platform according to claim 2, wherein:

the combination generator module is configured for generating a plurality of iterated stateflow representations for the FSM-modeled system according to iterated alternatives, each of the iterated stateflow representations representing behavior of the FSM-modeled system when operating according to one or more of the iterated alternatives.

4. The design optimization platform according to claim 3, wherein:
the scoring mechanism module is configured for generating an iterated score for each of the iterated stateflow representations.

5. The design optimization platform according to claim 4, further comprising:
an optimized design module configured for determining an optimized stateflow representation for the FSM-modeled system based at least in part on the scores and the iterated scores.

6. The design optimization platform according to claim 5, further comprising:
wherein the scoring mechanism module is configured for calculating the scores and the iterated scores according to an optimization algorithm.

7. The design optimization platform according to claim 5, further comprising:
a weightings module configured for assigning weight values to be used by the scoring mechanism module in calculating the scores and the iterated scores.

8. The design optimization platform according to claim 7, wherein:
the weight values are assigned for one or more of level hierarchy, nested structures, quantity of connections between states, radius of state diagram, space between states, and predefined structures.

9. The design optimization platform according to claim 1, wherein:
the scoring mechanism module includes an optimization algorithm configured to operate as a genetic algorithm.

10. The design optimization platform according to claim 1, wherein:
the scoring mechanism module includes an optimization algorithm configured to operate as a local search algorithm.

11. A design optimization platform, comprising:
a system design module configured for receiving data associated with a design of a finite state machine (FSM)-modeled system from a user device, wherein the data describes states, state transitions, events, and outputs of the FSM-modeled system;
a combination generator module configured for generating a plurality of stateflow representations for the FSM-modeled system according to domain and iterated alternatives, each of the stateflow representations reflecting behavior of the FSM-modeled system when operating according to one or more of the domain and iterated alternatives; and
a scoring mechanism module configured for generating a score for each of the stateflow representations.

12. The design optimization platform according to claim 11, further comprising:
an optimized design module configured for determining an optimized stateflow representation for the FSM-modeled system based at least in part on the scores determined for the stateflow representations.

13. The design optimization platform according to claim 12, wherein:

the optimized design module is configured for directing an iteration module to iterate the domain alternatives into the iterated alternatives based at least in part on analyzing one or more of the scores according to an optimization algorithm.

14. The design optimization platform according to claim 13, wherein:

the scoring mechanism module is configured for calculating the scores according to an optimization algorithm.

15. A method for design optimization, comprising:

receiving data associated with a design of a finite state machine (FSM)-modeled system from a user device, wherein the data describes states, state transitions, events, and outputs of the FSM-modeled system;

receiving a plurality of domain knowledge rules to define domain alternatives for one or more of the states and state transitions of the FSM-modeled system;

generating a plurality of stateflow representations for the FSM-modeled system, each of the stateflow representations reflecting behavior of the FSM-modeled system when operating according to one or more of the domain alternatives; and generating a score for each of the stateflow representations.

16. The method according to claim 15, further comprising:

generating the domain alternatives based at least in part on randomizing one or more characteristics for the domain knowledge rules.

17. The method according to claim 16, further comprising:

automatically iterating one or more of the domain alternatives into iterated alternatives; and generating a plurality of iterated stateflow representations for the FSM-modeled system, each of the iterated stateflow representations expressing original behavior of the FSM-modeled system when operating according to one or more of the iterated alternatives.

18. The method according to claim 17, further comprising:

generating an iterated score for each of the iterated stateflow representations.

19. The method according to claim 18, further comprising:

determining an optimized stateflow representation for the FSM-modeled system based at least in part on the scores and the iterated scores.

20. The method according to claim 19, further comprising:

calculating the scores and the iterated scores using an optimization algorithm.

* * * * *